May 17, 1966 E. I. GORDON 3,252,104

D.C. QUADRUPOLE STRUCTURE FOR PARAMETRIC AMPLIFIER

Filed Nov. 23, 1959 3 Sheets-Sheet 1

INVENTOR
E. I. GORDON
BY David P. Kelley
ATTORNEY

INVENTOR
E. I. GORDON
BY David P. Kelley
ATTORNEY

May 17, 1966 E. I. GORDON 3,252,104

D.C. QUADRUPOLE STRUCTURE FOR PARAMETRIC AMPLIFIER

Filed Nov. 23, 1959 3 Sheets-Sheet 3

INVENTOR
E. I. GORDON
BY David P. Kelley
ATTORNEY

United States Patent Office 3,252,104

Patented May 17, 1966

3,252,104
D.C. QUADRUPOLE STRUCTURE FOR PARAMETRIC AMPLIFIER

Eugene I. Gordon, Morristown, N.J., assignor to Bell Telephone Laboratories, Incorporated, New York, N.Y., a corporation of New York Filed Nov. 23, 1959, Ser. No. 854,737
5 Claims. (Cl. 330—4.7)

This invention relates to electron beam devices and more particularly to such devices of the parametric amplifier type.

Of the many advances made in the microwave art in recent years, one of the most important is the discovery that the principles of parametric amplification can be used to attain many desirable results. The term "parametric amplifier" in general refers to a family of electrical devices in which amplification is achieved through the periodic variation of a circuit parameter. As applied to high frequency electron discharge devices the term generally refers to a device in which a signal wave is used to modulate an electron beam, the signal modulations being subsequently amplified through periodic variations of certain beam or circuit parameters by the use of a "pump" frequency.

One type of electron discharge tube parametric amplifier is described in the United States application for patent of C. F. Quate, Serial No. 698,854, filed November 25, 1957. Because the device disclosed in the Quate application effects amplification through principles which are completely different from those of prior devices such as the conventional traveling wave tube, many of the inherent deficiencies of these devices are avoided. In the conventional traveling wave tube, for example, amplification can only take place through signal wave interaction with space charge waves propagating in the slow mode of the beam, whereas gain in the parametric amplifier may be produced through interaction with fast mode space charge waves. This is significant in that slow mode energy is at a lower level than the D.-C. kinetic energy of the beam, while energy propagating in the fast mode represents energy in excess of the D.-C. kinetic energy of the beam. As a result, substantially all of the inherent beam noise within a predetermined bandwidth can be removed from the fast space charge waves, whereas such removal is quite difficult, if not impossible, when coupling takes place in the slow mode. Hence, the Quate device, by operating in the fast mode, is capable of producing low noise amplification.

Detracting somewhat from the obvious advantages of the Quate device, however, are certain second order effects which may arise in operation. The necessary beam parameter variation of the Quate device is attained by coupling a pump frequency wave onto the beam. Amplification then results through the mixing of the signal and pump frequency waves on the beam. Such mixing, however, in turn may result in the coupling of certain upper sideband frequencies to the pump and signal frequencies. As a result, beam noise which exists at these sideband frequencies might become amplified with the signal and manifest itself at the output. Further, the coupling per se may impede the parametric amplification process and thereby reduce the tube gain.

These disadvantages can be substantially reduced through the use of a parametric amplifier arrangement of the cyclotron wave type. The magnetic focusing field of a cyclotron wave device is adjusted such that the cyclotron frequency of the beam is approximately equal to the frequency of the signal input wave. The phrase "cyclotron frequency" refers to the angular velocity at which a particle in a magnetic field will rotate if a force transverse to the magnetic field is applied thereto. In this case, the magnetic field is in the same direction as the beam flow. The transverse force to produce rotation results from a transverse electric field which is a function of the amplitude of the signal wave during some time increment in which the beam passes through a signal input coupler. Since the radius of rotation of a particle rotating at a cyclotron frequency is a function of the force thereon transverse to the magnetic field, the radius of rotation of beam particles in a cyclotron resonant device is a function of the signal input wave which is coupled to the beam. One may therefore think of beam modulation at the cyclotron frequency through the use of transverse electric fields as being a modulation of the radii of rotation of beam particles. Energy waves which propagate by means of such electron rotation are generally referred to as cyclotron waves.

Although this form of wave propagation obviously differs from space charge wave propagation resulting from longitudinal modulation through axial displacement of beam particles, as utilized in the conventional traveling wave tube and in the aforementioned Quate device, one may consider them to be analogous in terms of propagation velocity. Just as space charge waves may propagate in the fast or slow mode, cyclotron waves of a given frequency may travel at either of two modes of propagation. Slow mode propagation takes place at a lower phase velocity than the D.-C. translational velocity of the beam and is representative of an energy level which is lower than the D.-C. kinetic energy of the beam. Energy in excess of the D.-C. beam kinetic energy is transmitted in the fast mode, or at a higher phase velocity than the translational velocity of the beam. Hence, noise may be "stripped" from the beam of a cyclotron resonant device in the signal bandwidth of the fast mode in a similar manner as described with reference to the Quate device. Subsequent to the removal of certain fast mode noise and the introduction of a signal wave onto the beam, pump frequency energy is mixed with the signal wave to effect parametric amplification.

One of the most striking advantages of a cyclotron wave amplifier is the high dispersion of the beam. Because of this dispersion, higher frequency upper sideband waves travel at a much lower phase velocity than the signal wave and are therefore so far out of synchronism with the signal wave that coupling thereto is negligible. Another advantage is the extremely wide bandwidth over which the device can operate.

An improved form of cyclotron wave parametric amplifier is described in my copending application for patent Serial No. 821,434, filed June 19, 1959. That device is advantageous over prior parametric amplifiers in that an independent source of high frequency pump power is not required. Rather, a spatially alternating magnetic focusing field is used to provide the necessary parametric variations. The alternating field converts D.-C. beam energy into signal wave energy to effect amplification, and, from this standpoint, the device of my copending application is analogous to the operation of a conventional traveling wave tube.

Although the device of my copending application represents a significant advance over prior cyclotron resonant devices, it has been found that in certain cases the electron paths in the amplification region tend to be somewhat erratic. More specifically, the loci of centers of the spiraling electrons near the beam periphery diverge when high intensity flux alternations are used to produce high gain. If the signal input power is high, each individual electron will have a proportionately large radius of rotation. This large radius of rotation, together with the divergence of the locus of centers, may result in electron impingement on the tube envelope with consequent malfunctioning of the device.

It is an object of this invention to obviate the necessity of introducing pump input power into an electron beam parametric amplifier.

It is another object of this invention to produce high gain amplification of high power signal energy in an electron beam parametric amplifier.

It is a specific object of this invention to eliminate undesired electron impingement in a high gain parametric amplifier which produces amplification through the conversion of D.-C. beam kinetic energy into rotational beam kinetic energy.

These and other objects of my invention are attained in a specific embodiment thereof wherein a coupler such as an input cavity resonator is used to introduce signal energy onto an electron beam flowing from an electron gun to a collector. The resonator also extracts noise energy from the beam in the signal mode. A magnetic focusing field is directed parallel with the path of flow of the beam thereby giving rise to an inherent cyclotron or rotational frequency of the beam particles. The focusing field in the input section is adjusted to produce a cyclotron frequency which is approximately equal to the signal frequency. The input resonator produces electric fields which are transverse to the path of beam flow and thereby modulates the radii of rotation of the beam electrons in accordance with the varying amplitude of the signal wave. Noise within the signal frequency bandwidth is extracted from the beam by the reverse operation, i.e., spurious rotational energy is given up to the input coupler. All modulation and demodulation is done in the fast cyclotron mode of the beam.

Since the beam particles have both translational and rotational energy, they will follow helical paths toward the collector. The radius of curvature of the individual paths is indicative of the transmitted signal energy. As will be explained hereinafter, the signal wave is amplified in a drift region through the conversion of D.-C. beam translational energy into rotational energy. Subsequent to amplification, the beam is allowed to flow through an output device such as a cavity resonator where the amplified signal energy is extracted from the beam.

It is a feature of this invention that a spatially alternating electrostatic field be produced in the drift region of the tube. This field serves to deflect the spiralling electrons of the beam in such a manner as to convert D.-C. translational energy into rotational energy.

It is another feature of this invention that the aforementioned electrostatic field be produced by a series of quadrupoles arranged successively in the longitudinal direction of the beam along the drift region.

It is still another feature of this invention that adjacent poles in each quadrupole array and adjacent poles of successive quadrupole arrays have opposite D.-C. electrostatic polarities. This structure results in the production of an electric field which is spatially alternating in both the longitudinal and circumferential senses of the beam.

The spatial alternations of the electrostatic field produce the necessary parametric variations for parametric amplification. As such, these spatial alternations must be in synchronism with the cyclotron motion of the electrons of the beam. Accordingly, it is another feature of this invention that the distance between successive quadrupoles be a predetermined function of the D.-C. beam velocity and the cyclotron frequency in the drift region.

These and other features of my invention will become more clearly understood from the following detailed description, taken in conjunction with the accompanying drawing, in which.

Figure 1:
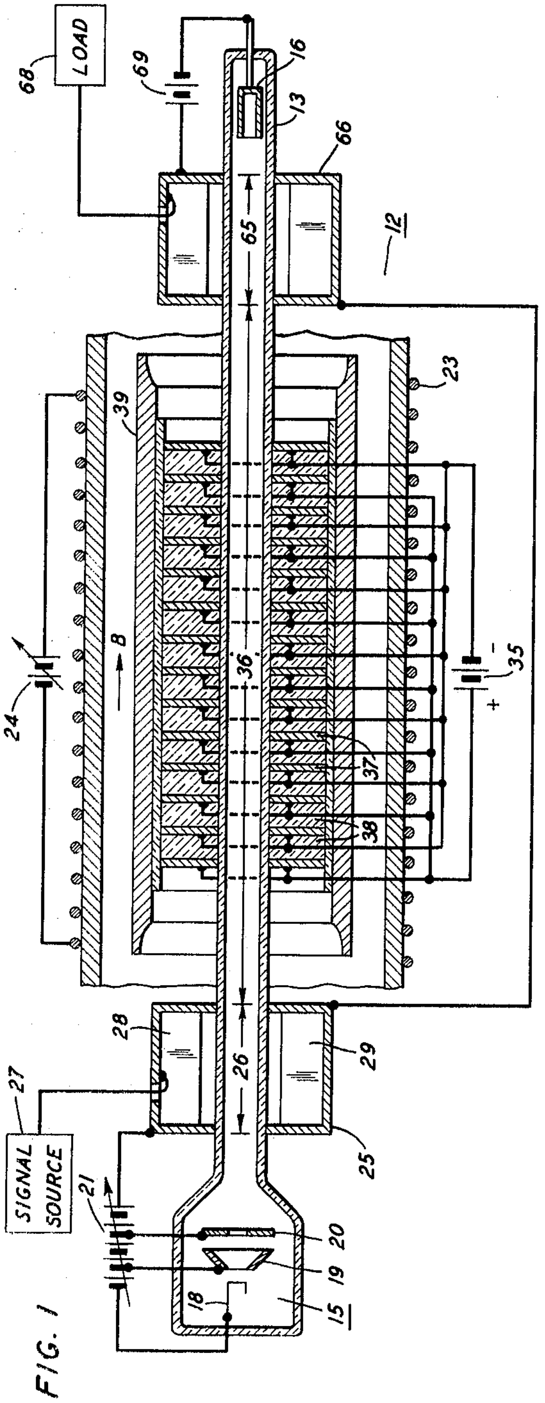
FIG. 1 is a sectional view of one illustrative embodiment of my invention.

Referring now to FIG. 1, there is shown an electron discharge device 12 embodying the principles of the present invention. Located at opposite ends of an evacuated envelope 13 are an electron gun 15 and a collector electrode 16. Electron gun 15 is shown for illustrative purposes as comprising an emissive cathode 18, a beam forming electrode 19, and an accelerating electrode 20. These elements of electron gun 15 form and project a beam of electrons toward collector 16. Battery 21 biases the accelerating and beam forming electrodes positively with respect to the cathode. The D.-C. velocity of the beam can be adjusted by adjusting the bias of battery 21 as is well known in the art.

The electron beam is constrained to flow along a predetermined path and prohibited from impinging against envelope 13 by means of a magnetic field in the direction shown by the arrow labelled B. The magnetic focusing field may be maintained through the use, for example, of a solenoid electromagnet 23 as is well known in the art. The magnetic field produced by magnet 23 can be adjusted by varying the potential of variable battery 24.

As is pointed out in my copending application, transverse electric fields can be used to excite cyclotron waves on a longitudinally focused beam if the electric fields alternate in synchronism with the inherent cyclotron frequency of the beam. The cyclotron frequency is a function of the strength of the magnetic focusing field and can therefore be conveniently adjusted. Cyclotron waves can likewise be removed by the reverse operation, i.e., rotational energy may be removed to effect beam demodulation by induced transverse electric fields.

To these ends, downstream from electron gun 15, there is included a cavity resonator 25. Resonator 25 is excited by electromagnetic wave energy from signal source 27. This excitation produces an alternating electric field of the signal frequency between ridges 28 and 29 of resonator 25. The magnetic field in input section 26 is adjusted to produce an inherent beam cyclotron frequency that is approximately equal to the signal frequency thereby insuring strong coupling between the signal wave and the beam. Ridges 28 and 29 are the equivalent of a parallel plate capacitor and the effective phase velocity of the electric field extending therebetween is infinite. This satisfies the condition for fast mode modulation that the electromagnetic signal wave have a faster phase velocity than the D.-C. velocity of the beam. Since the signal wave is in approximate synchronism with the cyclotron frequency, substantially all of the signal energy will be converted to electron rotational energy or, in other words, cyclotron wave energy. Individual electrons leave input section 26 having helical trajectories due to their rotational and translational velocity components. Fast cyclotron mode noise is extracted by resonator 25 through the conversion of spurious electron rotational energy to electromagnetic wave energy. The transverse electric fields produced by spurious noise cyclotron waves within the signal bandwidth excite currents within resonator 25 whereby the inherent beam noise energy is effectively transferred to the resonator. The noise energy is then transmitted to, and dissipated by, signal source 27. The signal source can comprise any of various elements. For example, if the source 27 is an antenna, the noise energy will be radiated therefrom.

After leaving input section 26, the electron beam travels through a drift region 36. Surrounding the drift region are a series of quadrupole arrays 37 with insulator spacers 38 between each quadrupole. The quadrupoles are charged electrostatically by a voltage source 35 and provide the necessary parametric variations for signal wave amplification as will be described hereinafter. The spacing between each quadrupole is proportional to the beam's D.-C. velocity and inversely proportional to the cyclotron frequency, as will also be explained hereinafter. Surrounding the quadrupole arrays is a ferromagnetic cylinder 39 for reducing the cyclotron frequency in the drift region and thereby permitting wider spacing between adjacent quadrupoles. Cylinder 39 deflects the magnetic flux lines which thread through drift region 36 and hence reduces the flux density in the drift region. The lower flux density results in a correspondingly lower cyclotron frequency. It is to be understood that cylinder 39 is not essential to tube operation. At relatively low frequencies there is no need for increasing the spacing between successive quadrupoles, and cylinder 39 may be eliminated.

Figure 2:
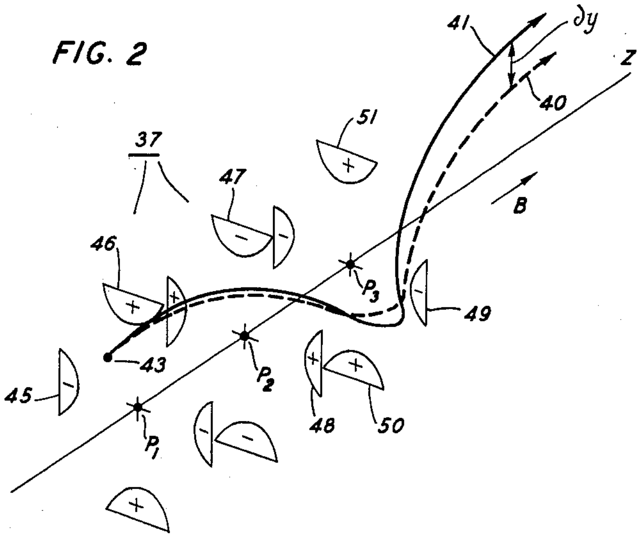
FIG. 2 is a schematic representation of the trajectory of an electron traveling through the drift region of the device of FIG. 1.

The quadrupoles 37 in drift region 36 serve to amplify the signal cyclotron wave by converting D.-C. drift energy of the electron beam into rotational energy. FIG. 2 is a perspective view of drift region 36 illustrating schematically the configuration of three of the quadrupole arrays. Path 40 illustrates, for purposes of comparison, the helical trajectory that an electron leaving input section 26 would take in the absence of quadrupoles 37, while path 41 is the trajectory of an electron 43 having a locus of centers of rotation which is coincident with the axis of the tube, and which is acted upon by quadrupoles 37. The difference of radius $\partial_y$ of paths 40 and 41 illustrates the amplification of rotational or cyclotron energy which is attained by my device.

Figure 5:
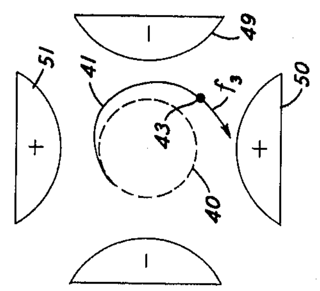
FIGS. 3, 4 and 5 illustrate successive phase positions of an electron traveling through the drift region of the device of FIG. 1.
Figure 4:
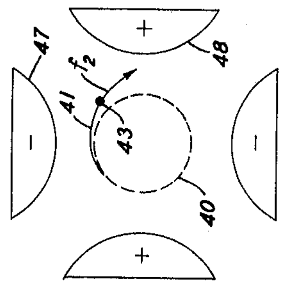
Figure 3:
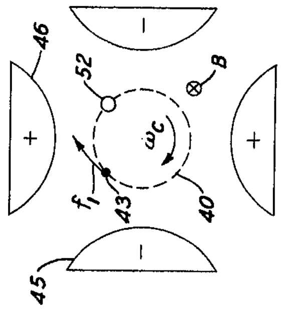

FIGS. 3, 4 and 5 show the phase position of electron 43 as it passes through the successive transverse planes of points $P_1$, $P_2$ and $P_3$, respectively, of FIG. 2. These figures are included to illustrate how the electric fields produced by successive quadrupoles deflect electron 43 to amplify its rotational energy. The direction of translational drift is into the paper, and the sense of rotation is clockwise as shown by arrow $\omega_c$. At position $P_1$, electron 43 is acted upon by the electric field produced by poles 45 and 46. The force $f_1$ from the electric field is in the same direction as the angular velocity of rotation or cyclotron frequency $\omega_c$ and therefore the rotational energy of the electron is increased. When electron 43 reaches position $P_2$ of FIG. 2, its phase position is that shown in FIG. 4. The polarities of poles 47 and 48 result in a force $f_2$ which again increases the radius of rotation of the electron. Likewise, at position $P_3$, poles 49 and 50 produce a force $f_3$ in the direction of electron rotation. A comparison of paths 40 and 41 illustrates the net gain of rotational energy of electron 43.

Examination of FIGS. 3 through 5 will show that not all electrons in the beam will gain rotational energy as they travel past the quadrupoles. For example, electron 52, shown in FIG. 3, which leads electron 43 by 90 degrees, will be acted upon by forces which oppose its velocity of rotation. It can be shown, however, that the various electrons gain or lose energy as an exponential function of the distance they travel in drift region 36. Those that gain energy, therefore, leave the drift region with a radius of rotation which is several times greater than that with which they entered. Hence, even if the out-of-phase electrons lose all of their rotational energy, there will be a net gain of rotational energy of the beam as a whole.

Figure 6:
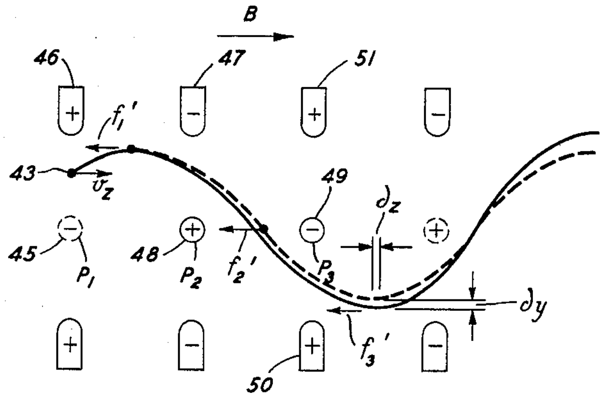
FIG. 6 is another view of the trajectory of an electron traveling through the amplification region of the device of FIG. 1.

At this juncture it should be pointed out that the electrons of the beam 18 do not extract energy from the electrostatic fields of the quadrupoles. Rather, the electrons are deflected in such a way as to convert a certain portion of their D.-C. translational energy into rotational energy. FIG. 6 illustrates how electron 43 loses a part of its translational energy. The electrostatic field between poles 46 and 47 produces a force $f_1'$ which is in opposition to the translational velocity component $v_z$ of the electron. As the electron moves between positions $P_2$ and $P_3$ of FIG. 2 it is acted upon by the field between poles 48 and 49 which produce a force $f_2'$ which again slows down the translational velocity of the electron. The loss of translational energy of the electron is manifested by a translational lag $\partial_z$ during one-half cycle of its rotation, while the radius of rotation is increased by an amount represented by $\partial_y$. One can see by the relative polarities of succeeding poles that the translational velocity of electron 43 is further reduced by opposing forces which it encounters with each succeeding electric field. A similar analysis of electron 52 of FIG. 3 shows that it gains translational energy as it loses rotational energy.

From the foregoing discussion, it is apparent that the position of succeeding quadrupoles 37 must be in synchronism with succeeding phase positions of the electrons of the beam. This synchronism is achieved by making the spacings between quadrupoles 37 dependent upon the translational velocity and cyclotron frequency of the beam in drift region 36. More specifically, the distance between each succeeding quadrupole is equal to the axial distance that an electron travels during one-quarter cycle of its rotation.

For purposes of illustration, the locus of centers of rotation of electron 43 was chosen to be coincident with the axis of the tube. The trajectories of electrons that do not rotate about the tube axis are somewhat more complicated because of the nonuniform forces which are exerted on them. In the interest of simplicity, neither mathematical nor physical analyses of the trajectories of such electrons are included. It can, however, be shown that the loci of centers of rotation of such electrons describe predetermined paths and are substantially constrained within the boundary of the beam.

Figure 7:
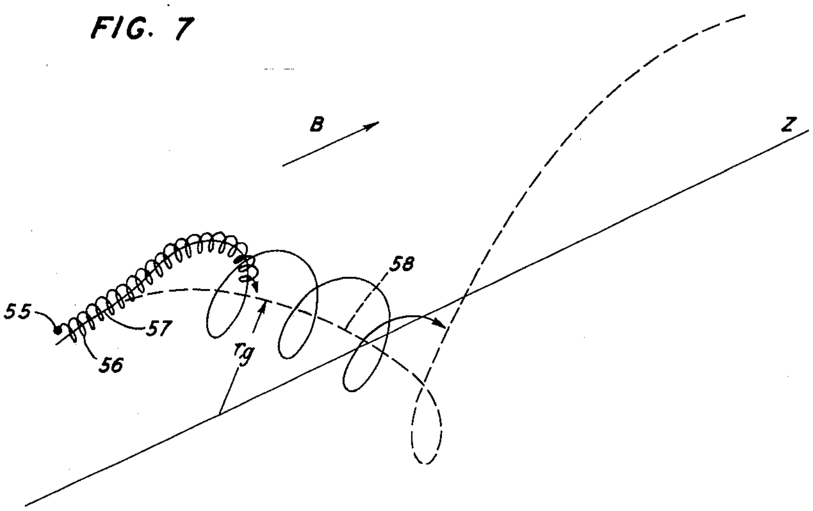
FIG. 7 is a schematic representation of the trajectory in the drift region of the device of FIG. 1 of an electron whose locus of centers of rotation is displaced from the tube axis.

FIG. 7 shows an electron 55 having a trajectory 56 as it enters drift region 36. The locus of centers of rotation 57 of electron 55 is displaced from the central axis $z$ of the tube. It can be shown that the locus of centers of rotation 57 describes a helix-like path in the drift region that has a guiding center 58. The guiding center 58 remains at a substantially constant distance $r_g$ from the central axis of the tube.

Figure 8:
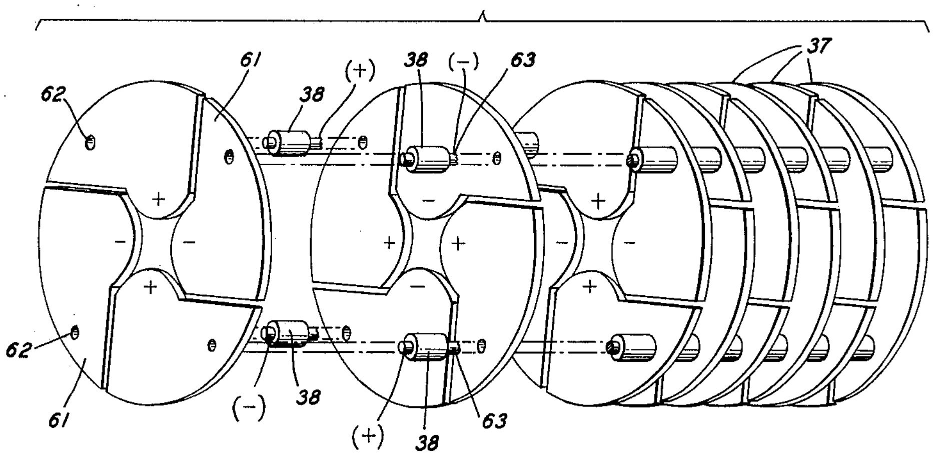
FIG. 8 is a perspective view of an array of quadrupoles which may be used in the device of FIG. 1.

For purposes of illustration, quadrupoles 37 of FIG. 1 were shown to be individually connected to battery 40. A more practical arrangement of quadrupoles is shown in FIG. 8. Each pole of the quadrupoles 37 has an extension 61. Each extension 61 has an opening 62 through which a biasing rod 63 extends. Extensions 61 of successive poles extend in opposite directions to intercept alternately a positively charged biasing rod and a negatively charged biasing rod. Besides charging the various poles to the desired polarity, biasing rods 63 serve to support the quadrupole arrays 37 in a simple manner so that they can be conveniently fitted over envelope 13 of the device of FIG. 1. Spacers 38 insulate succeeding quadrupoles and are of an appropriate length to insure proper synchronism between the electrostatic fields and the beam as explained previously.

After traversing the drift region 36, the electron beam passes through output region 65 where the signal cyclotron wave is extracted from the beam by output resonator 66. The output resonator is resonant at the signal frequency and extracts signal energy in the same manner by which input resonator 25 extracts noise energy. Upon extraction, the signal energy is transmitted to an appropriate load 68.

As pointed out previously, the D.-C. velocity of the beam is determined by the potential across adjustable battery 21. To this end resonators 25 and 66 as well as quadrupoles 37 are biased with a positive D.-C. potential from battery 21. In my device, however, it is not necessary for beam collection that the collector 16 be biased to as high a positive voltage as these elements. Since there is no translational velocity modulation, all of the electrons have sufficient kinetic energy to reach the collector. By biasing collector 16 negatively with respect to resonator 66 by means of battery 69, the beam velocity is reduced before it impinges on the collector and energy lost through secondary emission and heat radiation is minimized.

As can be appreciated from the foregoing, an electron discharge device which is constructed according to the principles of the present invention is capable of producing low noise amplification of high frequency signal waves with very high efficiency. Since all signal wave propagation on the beam is in the fast cyclotron mode, spurious signal mode noise may be stripped from the beam. No independent source of pump power is required because all of the energy for amplification comes from the translational kinetic energy of the beam. Although amplification is a result of beam parameter variations, these variations need not be related to the signal frequency because the beam cyclotron frequency can be reduced in the drift region. Further, my device is capable of producing high gain amplification of high power input signal waves because all of the electrons are constrained to follow predetermined paths and prohibited from impinging on the tube envelope. Finally, my parametric amplifier is highly efficient, not only because all of the energy for amplification comes from the beam, but also because losses at the collector due to heat radiation and secondary emission are minimized.

It is to be understood, however, that the above-described arrangements are merely illustrative of the application of these principles of the present invention. Numerous other arrangements may be devised by those skilled in the art without departing from the spirit and scope of this invention.

What is claimed is:

1. An electron discharge device comprising means for forming and projecting a cylindrical electron beam along a path, means for collecting said beam, a plurality of arrays of conductive poles, axially arranged along said path, each array substantially surrounding a portion of said beam, a substantial lateral extension on each of said poles, the extensions of successive poles along said path protruding in opposite directions, a plurality of conductive rods each being substantially parallel with said path and in contact with successive ones of said extensions, and means for producing opposite electrostatic polarities on adjacent conductive rods whereby an electrostatic field is produced throughout said electron beam which spatially alternates in both the circumferential and longitudinal senses of said beam.

2. The electron discharge device of claim 1 wherein:
all of the poles are of substantially identical configuration;
all of the pole extensions of each array extend in a tangential direction with respect to the cylindrical beam path;
all of the extensions of alternate arrays extend in a clockwise tangential direction with respect to the beam path;
and all of the extensions of the other alternate arrays extend in a counter-clockwise tangential direction with respect to the beam path.

3. The electron discharge device of claim 2 wherein:
each of the poles is of a flat, planar configuration;
and all of the poles of such array are arranged in a plane transverse to the beam path.

4. The electron discharge device of claim 3 further comprising:
a plurality of spacers, each of which abuts against successive extensions for positioning the successive poles at predetermined successive locations;
and wherein each rod extends through central apertures in successive spacers and through apertures in the lateral extensions with which it makes contact.

5. The electron discharge device of claim 4 further comprising:
a cylindrical envelope surrounding the beam path;
and wherein:
the pole extensions are external of the envelope;
and each pole abuts against the envelope, whereby the poles are supported by the rods and envelope and are aligned by the rods, spacers, and envelope.

References Cited by the Examiner

UNITED STATES PATENTS

| | | | |
|---|---|---|---|
| 2,834,908 | 5/1958 | Kompfner | 315—3.6 |
| 2,844,753 | 7/1958 | Quate | 315—3.5 |
| 2,959,740 | 11/1960 | Adler | 315—5 X |
| 3,072,817 | 1/1963 | Gordon | 330—4.7 |

OTHER REFERENCES

Article by R. Adler, pages 1300–1301, Proc. I.R.E. for June 1958, vol. 46, No. 6.

Article by R. Adler et al., pages 1756–57, Proc. I.R.E. for October 1958, vol. 46, No. 10.

ROY LAKE, *Primary Examiner.*

RALPH G. NILSON, BENNETTE G. MILLER, E. JAMES SAX, *Examiners.*